United States Patent [19]

Slemmons

[11] Patent Number: 4,825,795
[45] Date of Patent: May 2, 1989

[54] SAILING CRAFT KEEL AND RUDDER FLOW MODIFIERS

[76] Inventor: Arthur J. Slemmons, 19655 Redberry Dr., Los Gatos, Calif. 95030

[21] Appl. No.: 28,100

[22] Filed: Mar. 19, 1987

[51] Int. Cl.$^4$ .............................................. B63B 3/38
[52] U.S. Cl. .............................. 114/140; 114/67 R; 114/162
[58] Field of Search ....................... 114/39.1, 39.2, 61, 114/123, 127, 140, 141, 142, 143, 162, 270, 67 R; 244/199, 200

[56] References Cited

U.S. PATENT DOCUMENTS

| | | | |
|---|---|---|---|
| 1,639,675 | 8/1927 | Snadecki | 114/162 |
| 1,795,346 | 3/1931 | Rebl | 114/162 |
| 1,799,538 | 4/1931 | Scholz | 114/162 |
| 2,099,229 | 11/1937 | Possenheim | 114/162 |
| 2,800,291 | 7/1957 | Stephens | 244/200 |
| 2,899,150 | 8/1959 | Ellis | 244/200 |
| 4,599,964 | 7/1986 | Kenney et al. | 114/126 |
| 4,606,291 | 8/1986 | Hoppe | 114/61 |
| 4,631,036 | 12/1986 | Grothues-Spork | 114/126 |
| 4,706,910 | 11/1987 | Walsh et al. | 244/199 |

FOREIGN PATENT DOCUMENTS

| | | | |
|---|---|---|---|
| 595877 | 4/1960 | Canada | 244/199 |
| 2114515 | 8/1983 | United Kingdom | 114/140 |
| 2136739 | 9/1984 | United Kingdom | 114/140 |

OTHER PUBLICATIONS

Bryan Thwaites, (Oxford at the Clarendon Press), Incompressible Aerodynamics, 1960, pp. 198–217.

Primary Examiner—Sherman D. Basinger
Assistant Examiner—Stephen P. Avila
Attorney, Agent, or Firm—Henry M. Stanley

[57] ABSTRACT

Arrays of parallel, substantially fore and aft oriented vortex generators are positioned on the keel and rudder of a sailboat to induce vortices at the surfaces of the keel and rudder for the purpose of reenergizing the boundary layers in the water flow past the keel and the rudder to increase the lateral lift in the horizontal plane and to thereby avoid increase in drag associated with keel and rudder stall at high angles of attack with the relative water flow. Similar arrays for the same purpose may be attached to other underwater stabilizing members such as skegs, keel winglets, centerboards, etc.

16 Claims, 2 Drawing Sheets

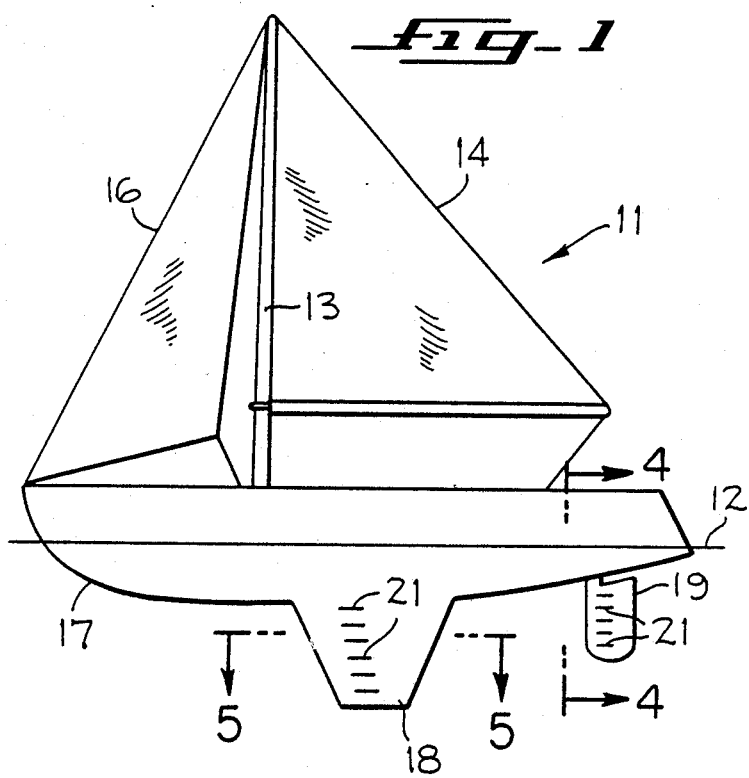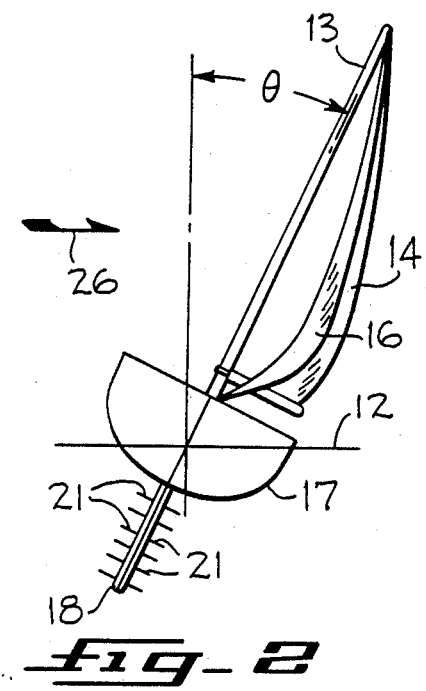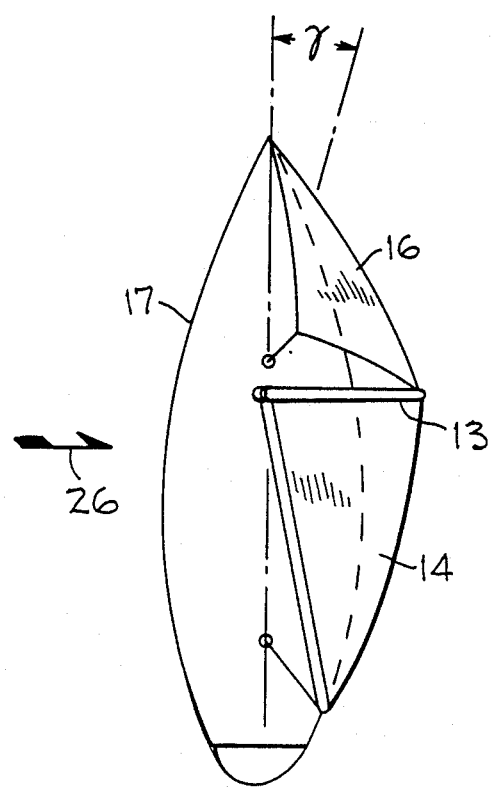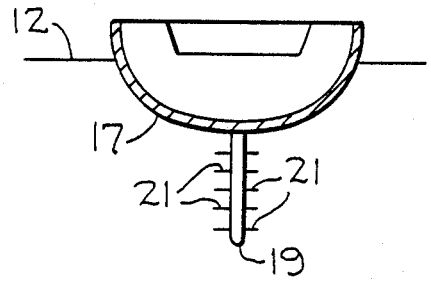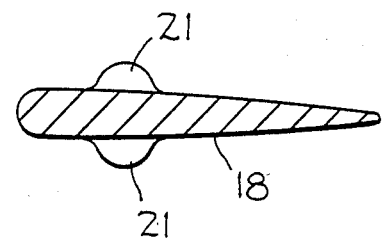

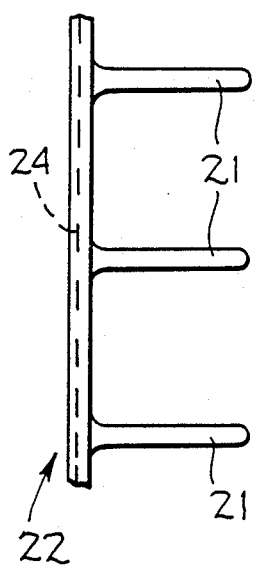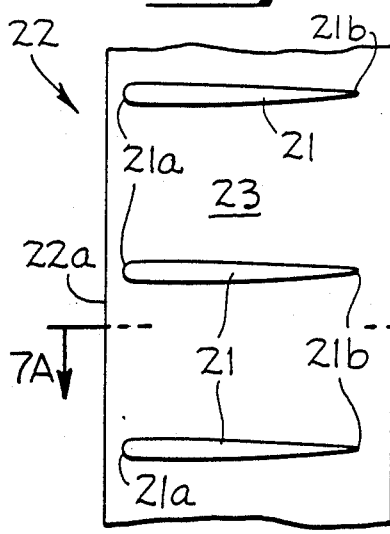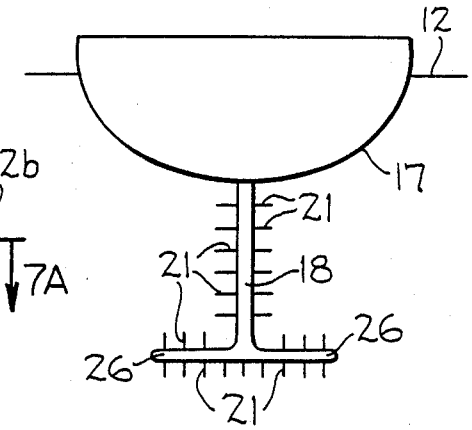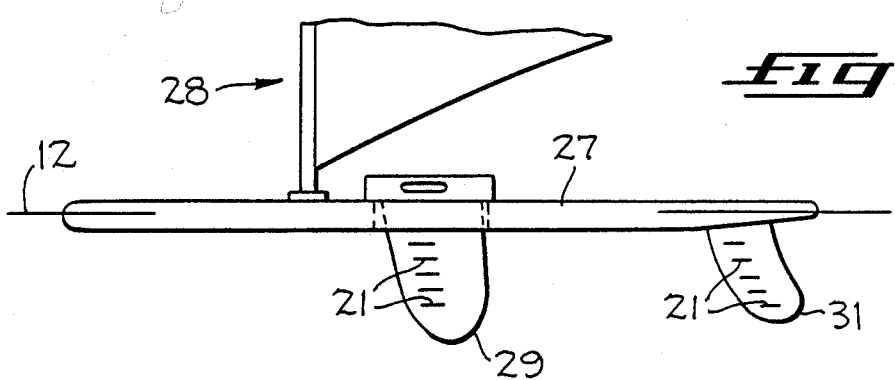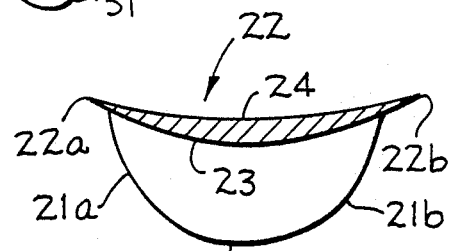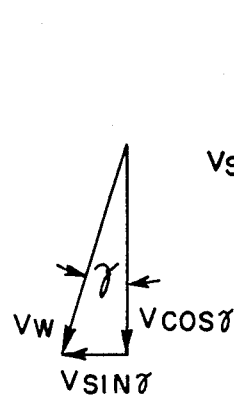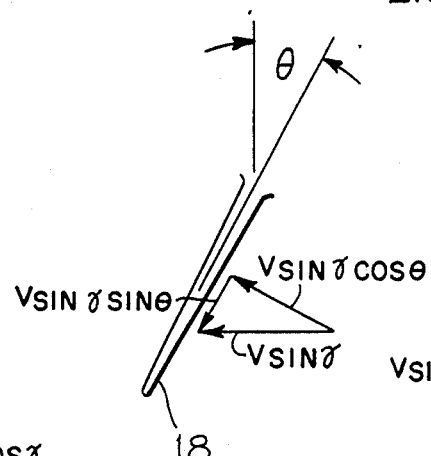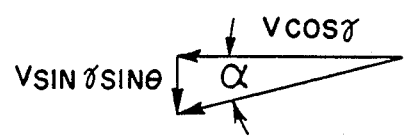

SAILING CRAFT KEEL AND RUDDER FLOW MODIFIERS

BACKGROUND OF THE INVENTION

I. Field of the Invention

This invention relates to flow modifiers for sailboat keels and rudders and more particularly to vortex generators for application to sailboat keels and rudders to achieve boundary layer control.

II. Description of the Prior Art

From 1948 through 1950, H. D. Taylor of the United Aircraft Corporation discovered that small mixing devices, now known as vortex generators can be used to increase the efficiency of diverging wall diffusers, air foils, axial flow fans, burner mixing, etc. The generators are simply energy converters in the form of an array of small, closely spaced, low aspect ratio foils or tabs mounted at an angle of attack to the free air stream on a surface having a boundary layer. Each generator accomplishes a conversion of translational energy into rotational energy in the form of a trailing tip vortex. The induced tip vortices reenergize the boundary layer by mixing the higher velocity air in the main stream with the lower velocity air in the boundary layer. This reenergizing of the boundary layer makes it more resistant to separation from a surface with an adverse pressure gradient. Separation would otherwise result in a leveling off of lift and large increases in drag with increasing air foil angles of attack. This is called stall and results in a loss of efficiency commonly measured as lift/drag (L/D) ratio.

Common applications of this principle are on axial flow fan intake shrouds, diverging diffusers, windmill blades, airplane wings and airplane vertical and horizontal stabilizers. The greatest number of applications have been on airplane wings. The vortex generators are placed on the wing surface at an angle of attack to the fore and aft direction of airplane travel. The foil axes of the vortex generators are either in an alternating plus and minus angle of attack orientation relative to the direction of the airplane travel to generate adjacent counter-rotating vortices, or in a parallel array with the foil axes at a constant angle of attack to the fore and aft direction of the airplane to generate co-rotating trailing vortices.

Due to the angle of attack of the vortex generators relative to the forward motion of the airplane, there is a small drag penalty for using vortex generators on aircraft surfaces at angles of attack which are less than the angle at which wing or control surfaces normally stall. This small drag penalty during normal flight is accepted in order to avoid the large losses in lift and much larger increases in drag during transient conditions requiring larger lift coefficients at higher angles of attack, beyond which, without the vortex generators, such surfaces would otherwise experience stall. The use of vortex generators allows the use of a smaller wing on an aircraft. Consequently, the smaller wing may be brought to a higher angle of attack producing higher lift before stall occurs. Thus, the large drag increase that occurs at stall is delayed until higher angles of attack occur. A relatively complete discussion of boundary layer control and vortex generators is found in Chapter VI of *Incompressible Aerodynamics*, Bryan Thwaites, published 1960, Oxford at the Clarendon Press.

The only known prior art in sailboats or marine vehicles using any type of foil on keels and rudders have been large lifting foils. These have generally been dimensionally large and used to lift the boat vertically out of the water. To develop such lift the foils are mounted with their foil axes at angles of attack to the fore and aft direction of the boat. The flow caused by the boat's forward motion through the water causes these foils to develop an upwards lift on the boat. Such arrangements are seen in U.S. Pat. No. 4,599,964, Kenny et al, and U.S. Pat. No. 4,606,291, Karl-Gunther W. Hoppe.

SUMMARY OF THE INVENTION

In one aspect of the invention disclosed herein a sailboat keel has opposing surfaces with a vertical span and a fore and aft extending chord. A plurality of spaced vortex generators are aligned in a row in the direction of the span, each generator extending laterally from the keel and aligned substantially with the chord. The plurality of vortex generators includes a continuous strip adapted for attachment to the keel surface with a plurality of vortex generator extending from the strip.

In another aspect of the invention a depending stabilizing member has a span extending from the underside of a sail equipped vessel which is adapted for wind driven movement across a water surface. An array of spaced foils are attached to and extend laterally from the stabilizing member along at least a portion of the span thereof. The spaced vortex generators are formed on a strip extending in the span direction with a plurality of integral foils spaced along and extending outwardly from the strip.

In yet another aspect of the invention apparatus is disclosed for inducing vortices in a flowing fluid. The apparatus includes a strip having opposing edges and a concave surface on one side of the strip with a convex surface on the opposing side of the strip. The convex and concave sides of the strip intersect at an least one edge of the strip so that they form a sharp edge along the length of the strip. A plurality of integral vortex generators are arrayed along the length of the strip extending between the edges thereof.

In yet another aspect of the invention apparatus is disclosed for inducing vortices in an incompressible fluid flow. A strip has a forward edge and a trailing edge and an upper and an under surface. The upper and under surfaces intersect at an acute angle at the forward edge of the strip and a plurality of vortex generating foils extends from the upper surface of the strip and between the forward and trailing edges thereof.

BRIEF DESCRIPTION OF THE DRAWINGS

FIG. 1 is an elevation view of a sailboat incorporating the present invention.

FIG. 2 is a bow view of a sailboat incorporating the present invention and heeled at an angle theta.

FIG. 3 is a plan view of the sailboat of FIG. 2.

FIG. 4 is a section along the line 4—4 of FIG. 1.

FIG. 5 is a section along the line 5—5 of FIG. 1.

FIG. 6 is a partial front view of a strip having an array of vortex generators formed thereon.

FIG. 7 is a plan view of the array of FIG. 6.

FIG. 7A is a section along the line 7A—7A of FIG. 7.

FIG. 8 is a bow view of a sailboat hull and keel incorporating the present invention.

FIG. 9 is an elevation view of a sail board incorporating the present invention.

FIG. 10 is a vector diagram showing water velocity relative to a sailboat keel.

FIG. 11 is a vector diagram showing another component of water velocity relative to a sailboat keel.

FIG. 12 is a vector diagram derived from FIGS. 10 and 11 showing the angle of attack of water at a vortex generator of the present invention.

DESCRIPTION OF THE PREFERRED EMBODIMENTS

Sailboat keels and rudders are used for horizontal upwind "lift" and steering in the water in the same manner as wings and movable control surfaces are used for vertical lift in aircraft moving through the air. The same basic scientific principles of fluid dynamics apply in both cases. In the case of aircraft the fluid is air, and in the case of sailboats the fluid is water. Boundary layer control has been found to be advantageous to delay stall in sailboat keel and rudder foils immersed in water. The maintenance of high horizontal lift coefficients and low drag coefficients (high L/D ratios) for sailboat keels and rudders is essential to the sailboat's speed through the water. The disclosed invention relates to the use of vortex generators that provide boundary layer control for sailboat keels and rudders and the like and yet avoid the drag penalty that would result from using vortex generators if the vortex generator foils were oriented at an angle to the fore and aft direction of the boat. This result is obtained due to a unique situation which is peculiar to sailboat keels and rudders and is utilized to achieve the aforementioned desirable objective.

As seen in FIG. 1 a sailboat shown generally at 11 is supported on the surface of a body of water 12 by buoyant force. The sailboat has a mast 13 which supports a mainsail 14 and a foresail 16. The sail rigging is of the usual type and is not described here as it is not pertinent to the disclosed invention. The sailboat has a hull 17 with stabilizing members depending from the underside thereof such as a keel 18 and a rudder 19. The keel and the rudder may be seen to extend a certain distance beneath the hull, which will be referred to as the span of the stabilizing member. In like fashion, each stabilizing member has a width from fore to aft which will be referred to as the chord. As seen in FIG. 1 an array of vortex generators or foils 21 extends in the direction of the span of the keel or rudder. FIG. 5 shows the manner in which the individual foils extend laterally from the stabilizing member (the keel in this instance). The vortex generators are generally short in span (root to tip) compared to their chord (leading rounded edge to trailing tapered edge). The ratio of span to chord is called the aspect ratio. The vortex generators of this invention preferably have a low aspect ratio. The vortex generators have a rounded shape in the plan view of FIG. 5, although triangular, rectangular or other shapes may serve as well.

FIGS. 6, 7 and 7A show a strip 22 having a plurality of spaced vortex generators 21 integrally formed with the strip and extending from an upper convex surface 23 on the strip as indicated in FIG. 7. Fillets are formed as shown between the vortex generator surfaces and the convex surface 23. The under surface of the strip is concave as indicated by the hidden line 24 in FIG. 6 and as shown in FIG. 7A. The vortex generators 21 are preferably rounded at a forward edge 21a and tapered to a thinner trailing edge 21b as best seen in FIG. 7. The strip thus has a forward edge 22a and a trailing edge 22b as also best seen in FIG. 7. It is important for the upper convex surface 23 to intersect the lower concave surface 24 of the strip 22 at an acute angle so that the forward edge 22a of the strip is feathered to a sharp configuration as shown in exaggerated fashion in FIG. 7A. It is preferred that the trailing edge 22b of the strip have a similar configuration as also shown in FIG. 7A. In this fashion when the strip 22 is fastened, for example by an adhesive, to the surface of a keel 18 or rudder 19, any irregularities in the keel or rudder surface do not distort the strip and the orientation of the vortex generators 21. Further, as applied to the stabilizing member the forward sharp edge 22a (at least) of the strip is faired into the keel or rudder surface as seen in FIG. 5. In like fashion, in the preferred form the trailing edge 22b of the strip is also faired into the surface of the stabilizing keel or rudder member.

The unique situation to which reference was made hereinbefore relates to the fact that when the sailboat is in lightwind conditions or is going downwind in a straight line there is relatively little lateral force on the boat, keel or rudder and there is little tendency for the keel or rudder to stall. The mast remains almost vertical and the flow of the water relative to the keel is essentially parallel, horizontal and to the rear. Consequently, vortex generators 21 arrayed as seen in FIG. 1 or FIG. 4 will have substantially zero angle of attack to the water flow and will therefore induce little or no additional drag. The amount of additional drag due to frontal area and additional wetted surface of the vortex generators is nearly negligible. When the sailboat is sailing crosswind or upwind, or is on a broad reach, however, there can be large lateral forces on the keel and rudder as the hull 17 rolls sideways or "heels". These large lateral forces are derived from the wind forces represented by the arrow 26 in FIGS. 2 and 3. FIG. 2 shows the boat heeled over through an angle theta relative to the vertical as a result of the wind forces on a crosswind or upwind course. These large lateral or sideways forces deriving from the wind force on the sails also give an additional lateral downwind or sideways motion to the boat called leeway as the boat moves horizontally forward across the surface of the water. This leeway angle is represented by the angle gamma of FIG. 3. The leeway angle can be periodically enlarged or diminished due to the cyclical wave motions that vary in opposite horizontal directions from wave crest to wave trough. As a result, the angle of attack of the relative water flow at the keel and rudder can be as high as 70° in a downwind direction at the trough and as low as −20° in an upwind direction at the wave crest. The combination of boat heeling and water flow due to boat leeway motion causes the direction of the water flow past the keel to have a component direction along the span of the keel that is toward the bottom of the keel. This flow component is roughly proportional to the heeling angle. It is during this condition of sailing that the keel and the rudder are most likely to stall due to the higher lateral force load on those members.

The present invention takes advantage of the aforementioned component of flow toward the bottom of the keel when sailing crosswind or upwind to provide the generation of trailing vortices on the sides of the keel or rudder without incurring a large induced drag penalty during downwind or lightwind sailing. By placing a row of vortex generator foils 21 along the keel 18 and the rudder 19 as shown in FIGS. 1 and 5 on each side of the stabilizing members, trailing vortices will be generated along the surfaces of the stabilizing members to delay stall of the members while sailing under cross or upwind conditions in a heeled over attitude. As mentioned hereinbefore, the vortex generator foils are preferably placed in a nearly fore and aft attitude extending horizontally from the surfaces of the stabilizing members. As also mentioned hereinbefore, the plan shape of the foils is preferably a rounded or delta (triangular) shape to minimize attachment of weeds.

For the purposes of showing a steady state angle of attack at the vortex generators for upwind or crosswind sailing, the effect of the angle of attack due to wave action will be presumed negligible. Referring first to FIG. 10, the keel 18 is depicted as the boat is sailing upwind or crosswind. The fore and aft direction of the boat is represented by the long dimension of the keel 18 and the velocity of the boat, VB is displaced in a downwind direction through the angle gamma as previously described with reference to FIG. 3. As a consequence, a vector diagram may be constructed representing the relative velocity of the water VW past the keel 18 which is equal in magnitude and opposite in direction to the velocity of the boat $V_B$. The water velocity $V_W$, hereinafter referred to as V, has two components V cosine gamma parallel to the surface of the keel and V sine gamma perpendicular to the surface of the keel.

Since the boat is also heeling through the angle theta as seen in FIG. 2, reference is made to FIG. 11 to resolve the vector V sine gamma into its components perpendicular to and parallel to the surface of the keel when heeled through the angle theta. The component parallel to the surface of the keel and downward in the span direction on the keel may be seen from the vector diagram of FIG. 11 to be the quantity V sine gamma sine theta. The other component of water flow velocity which determines the water angle of attack relative to the vortex generator foils is the quantity V cosine gamma from FIG. 10, which is parallel to the surface of the keel in the direction of the chord. FIG. 12 shows the vector diagram which describes the angle of attack alpha. It is determined by the components V cosine gamma and V sine gamma sine theta to produce the direction of water flow relative to the vortex generator foils. It may be seen that the tangent of the angle alpha is the quantity V sine gamma sine theta over V cosine gamma. Therefore, alpha equals arc tangent sine gamma sine theta over cosine gamma. Relatively straightforward calculations reveal that if gamma equal 5° and theta equals 20°, then alpha equals 1.7°. However, if gamma equals 10° and theta equals 30°, then alpha equals 9.84°. It may be seen that the higher the leeway and heel angles, the greater the angle of attack of the water at the keel and the greater the benefit created by the vortex generators in reconstituting the boundary layer at the keel surface to thereby improve the L/D ratio as hereinbefore described.

It may be considered desirable to tilt the vortex generators downward slightly toward the bow to increase the angle of attack previously calculated with reference to FIGS. 10, 11 and 12. This will exact some slight penalty during downwind or lightwind sailing conditions, but will enhance the benefits of vortices and delayed stall conditions as hereinbefore described.

The use of the vortex generators 21 may be extended to a number of sailing craft stabilizing members. For example, the hull 17 of FIG. 8 shows the keel 18 having laterally extending winglets 26 attached to the lower edge thereof. The winglets have vortex generators 21 along the upper and under surfaces as shown in FIG. 8. The vortex generator foils delay stall in the winglets in the same manner as hereinbefore described for the keel 18 or the rudder 19.

FIG. 9 shows a sail board 27 resting on the water surface 12 having a sail and mast configuration 28 well known to those in this art. The sail board is shown having a centrally located keel board 29 extending through a box formed in the sail board and having vortex generator foils 21 attached thereto as hereinbefore described for the keel 18 and rudder 19 of FIGS. 1 and 2. It should be noted that for this configuration the box in the sail board for receiving the center board 29 will require lateral openings to allow passage of the vortex generator foils 21 as the center board is inserted and removed. FIG. 9 also shows a skeg 31 positioned near the aft end of the sail board 27. The skeg also shows an array of vortex generators 21 attached thereto in the fashion and for the purposes hereinbefore described.

As described herein the present invention takes advantage of all of the span wise flows relative to sail craft depending stabilizing members and the angles of attack of these flows past the members when the sailing craft is traveling crosswind or upwind or on a broad reach. By placing the array of small spaced low aspect ratio vortex generator foils in a fore and aft direction on the surfaces of the depending members, trailing vortices are generated during boat heeling and leeway travel that mix the free flowing water with the boundary layers on the depending members to delay stall thereof, minimize the loss of horizontal lift on the members, and delay increase in drag due to stall of the members. When the boat is going downwind or in lightwind conditions the flow past the vortex generators is essentially parallel to the axes of the generator foils. The only additional drag loss going downwind is due to the small increase in additional wetted surface area and a small increase in frontal or profile drag. This can be negated by the use of a smaller keel and rudder, for example, made possible by the increase in efficiency resulting from the use of the vortex generators.

The invention envisions the spaced array of vortex generators 21 being placed in parallel array at an angle relative to the leading and trailing edges of the strip 22. This orientation of the vortex generator array on the strip is to accommodate location of the strip at a constant percentage of chord on a keel, for example, with a positive rake aft at the leading edge. It has been found appropriate to locate the array of generator foils at approximately thirty percent of the chord distance from the front edge of the stabilizing member.

Although the best mode contemplated for carrying out the present invention has been herein shown and described, it will be apparent that modification and variation may be made without departing from what is regarded to be the subject matter of the invention.

What is claimed is:

1. A sailboat keel having opposing surfaces with a vertical span and a fore and aft extending chord, comprising a plurality of spaced vortex generators aligned in a row in the direction of the span and extending laterally from the keel and aligned substantially with the chord, wherein said plurality of vortex generators comprise a continuous strip adapted for attachment to the surface of the keel, and a plurality of integral vortex generators extending therefrom.

2. A sailboat keel as in claim 1 wherein said continuous strip comprises a concave surface adapted for attachment adjacent the surface of the keel and a convex opposing side from which said vortex generators extend, whereby said strip has a leading edge faired into the keel.

3. A depending stabilizing member having a span extending from the underside of a sail equipped vessel adapted for wind driven movement across a water surface, comprising an array of spaced vortex generators attached to and extending laterally from the stabilizing member along at least a portion of the span of the stabilizing member, wherein said spaced vortex generators comprise a strip extending in the span direction, and a plurality of integral foils spaced therealong and extending therefrom.

4. A depending stabilizing member as in claim 3 wherein said strip comprises a concave under surface and a convex upper surface from which said foils extend.

5. Apparatus for inducing vortices in a flowing fluid comprising a strip for fastening to a keel and rudder of a sail equipped vessel, opposing edges on said strip, a concave surface on one side of said strip, a convex surface on the opposing side of said strip adapted to lie adjacent the keel and rudder, said one and opposing sides sharply intersecting at least one edge of said strip, and a plurality of integral vortex generators extending between said edges.

6. Apparatus as in claim 5 wherein said plurality vortex generators comprises an array of substantially parallel foils.

7. Apparatus as in claim 5 wherein said vortex generators comprise low aspect ratio foils.

8. Apparatus as in claim 5 wherein said plurality of vortex generators comprises foils having a rounded edge proximate said sharply intersecting side of said strip and a tapered trailing edge.

9. Apparatus for fastening to a rudder and a keel on a sailboat for inducing vortices in an incompressible fluid flow, comprising a strip having a forward edge and a trailing edge, an upper surface and an under surface on said strip, said under surface being shaped to lie against the rudder and the keel, said upper and under surfaces intersecting at an acute angle at said forward edge, and a plurality of vortex generating foils extending from said upper surface and between said forward and trailing edges.

10. Apparatus as in claim 9 wherein said under surface comprises a concave surface and said upper surface comprises a convex surface.

11. Apparatus as in claim 9 comprising an acute angle intersection between said upper and under surfaces, at said trailing edge.

12. Apparatus as in claim 9 wherein said plurality of vortex generating foils comprises an array of, substantially parallel foils.

13. Apparatus as in claim 9 wherein said plurality of vortex generating foils comprises a plurality of low aspect ratio foils.

14. Apparatus as in claim 9 wherein said foils comprise plate-like vortex generators, and rounded leading edges proximate to said strip forward edge.

15. Apparatus as in claim 5 wherein said opposing edges are feathered to a sharp configuration.

16. Apparatus as in claim 9 wherein said forward edge and trailing edge are feathered to a sharp configuration.

* * * * *